United States Patent
Graf et al.

(10) Patent No.: US 8,347,943 B2
(45) Date of Patent: Jan. 8, 2013

(54) DIECASTING TOOL ARRANGEMENT

(75) Inventors: Erik Graf, Stuttgart (DE); Gebhard Fischer, Remshalden (DE); Guido Soell, Urbach (DE)

(73) Assignee: Daimler AG, Stuttgart (DE)

( * ) Notice: Subject to any disclaimer, the term of this patent is extended or adjusted under 35 U.S.C. 154(b) by 738 days.

(21) Appl. No.: 12/532,413

(22) PCT Filed: Mar. 10, 2008

(86) PCT No.: PCT/EP2008/001883
§ 371 (c)(1),
(2), (4) Date: Sep. 22, 2009

(87) PCT Pub. No.: WO2008/116556
PCT Pub. Date: Oct. 2, 2008

(65) Prior Publication Data
US 2010/0116230 A1    May 13, 2010

(30) Foreign Application Priority Data
Mar. 23, 2007   (DE) .......................... 10 2007 014 146

(51) Int. Cl.
B22C 9/10      (2006.01)
B22D 19/00    (2006.01)
(52) U.S. Cl. ........................... 164/113; 164/98; 164/369
(58) Field of Classification Search .................... 164/98, 164/113, 369
See application file for complete search history.

(56) References Cited

U.S. PATENT DOCUMENTS

| 4,446,906 A | 5/1984 | Ackerman |
| 4,942,917 A | 7/1990 | Koch |
| 5,392,841 A * | 2/1995 | Anderson et al. ............. 164/113 |
| 2006/0048911 A1 * | 3/2006 | Newcomb ...................... 164/98 |

FOREIGN PATENT DOCUMENTS

| DE | 4230584 A1 | 3/1994 |
| DE | 10221675 A1 | 12/2003 |
| EP | 0438545 A | 7/1991 |
| JP | 08309479 A * | 11/1996 |

* cited by examiner

*Primary Examiner* — Kevin P Kerns
*Assistant Examiner* — Kevin E Yoon
(74) *Attorney, Agent, or Firm* — Patent Central LLC; Stephan A. Pendorf

(57) ABSTRACT

Diecasting tool for the production of a cylinder crankcase (2), comprising a salt core (4) and at least one cylinder sleeve (6), wherein the cylinder sleeve (6) comprises an upper end (8) on the cylinder head side, and a lower end (10) on the crankshaft side, and the cylinder sleeve (6) is supported on at least one center sleeve that is disposed on the diecasting tool, and the salt core (4) at least partially surrounds the cylinder sleeve (6) in the manner of a cladding, wherein the salt core (4) comprises a crown (12) that at least partially bears on one of the ends (8, 10) of the cylinder sleeve (6), and the core (4) comprising openings (14) that extend vertically beneath the end (8) of the cylinder sleeve (6) on the cylinder head side.

9 Claims, 4 Drawing Sheets

DIECASTING TOOL ARRANGEMENT

Figure 1:
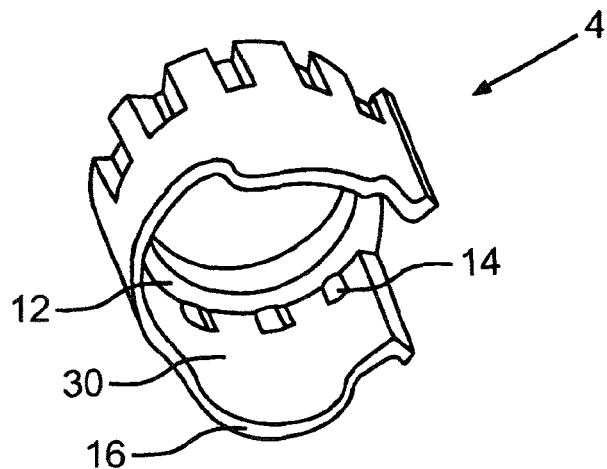

The invention relates to a diecasting tool according to claim 1, a cylinder crankcase according to claim 9 and a method for the production of a cylinder crankcase according to claim 10.

Cylinder crankcases in modern engines are subjected to high mechanical and thermal loads. Thus, a water jacket usually surrounds a cylinder sleeve, which serves for cooling, especially the cylinder path. This water jacket is open at the top (on the cylinder head side) with crankcases which are produced with a diecasting method. This is called "open deck" design. The open water jacket on the cylinder head side results in that cores or movable pushers are used in the metallic diecasting tool, which reproduce the water jacket after the casing. The cores or pushers have to be withdrawn prior to the opening of the crankcase, which is why no undercuts are allowed to conflict with the withdrawal. Therefore, no closed spaces can be depicted with this technique.

The open water jacket leads to a limitation of the mechanical load capacity of the engines. A partially closed water jacket ("closed deck design") would thus be better, but this cannot be executed with a conventional diecasting method. In U.S. Pat. No. 4,446,906 is described the use of a salt core which principally enables the production of a closed deck crankcase with the diecasting method. For this, an additional ring is placed around the cylinder sleeve, which keeps the salt core at a distance and positions it in the tool. The positioning by the ring is elaborate and however leads to a high scrap rate in practice, as the salt core is subjected to high bending loads due to different thermal expansions of salt, ring and casting tool. Additionally, only an insufficient metallic connection between ring, casting material and the cylinder sleeve results.

It is the object of the invention to provide a casting tool and a method for the production of a cylinder crankcase and a cylinder crankcase in the closed deck design, which comprises a higher stability and a higher process safety compared to the state of the art.

The solution of the object consists in a diecasting tool with the characteristics of claim 1, as well as a method for the production of a cylinder crankcase.

Claim 1 according to the invention thus comprises a diecasting tool for the production of a cylinder crankcase, comprising a salt core and at least one cylinder sleeve, wherein the cylinder sleeve comprises an upper end on the cylinder head side, and a lower end on the crankshaft side, and the cylinder sleeve is supported on at least one center sleeve that is disposed on the diecasting tool, and the salt core at least partially surrounds the cylinder sleeve in the manner of a cladding. The invention is thereby characterized in that the salt core bears rigidly on one end in the diecasting tool and in that the core comprises vertically progressing openings beneath the end of the cylinder sleeve on the cylinder head side.

Because the core bears on one end, usually on the end of the cylinder sleeve on the cylinder head side, the stability of the core during the casting process is increased. The salt core is fixed hereby and does not need any further fixing aids, as for example in the form of a support ring as known from U.S. Pat. No. 4,446,906. The openings beneath the end of the cylinder sleeve on the cylinder head side serve for being flown through with casting metal. The casting metal forms metallic webs after solidifying, which project through the water jacket (formed by the core), and which connect the cylinder sleeve with the recasting, that is the wall of the cylinder crankcase. A closed deck design is realized by this and the stability of the crankcase is increased.

By the special arrangement and fixation of the salt core, it is possible to also use larger and more complex-shaped salt cores. With the invention, coherent salt cores for multiple cylinder crankcases can also be used in a reliable manner.

These advantageous properties are realized by the casting tool according to claim 1, as well as the method for the production of a cylinder crankcase. Further advantageous embodiments result from the dependent claims.

Figure 2:
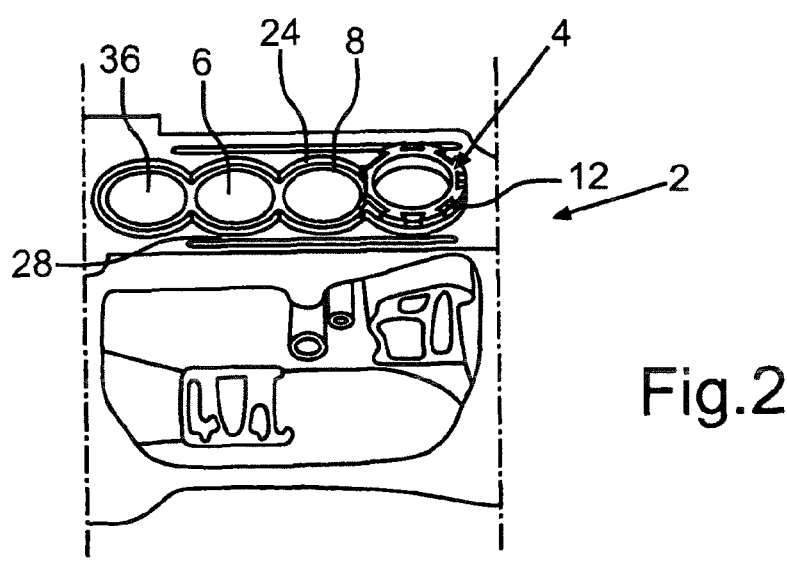
Figure 3:
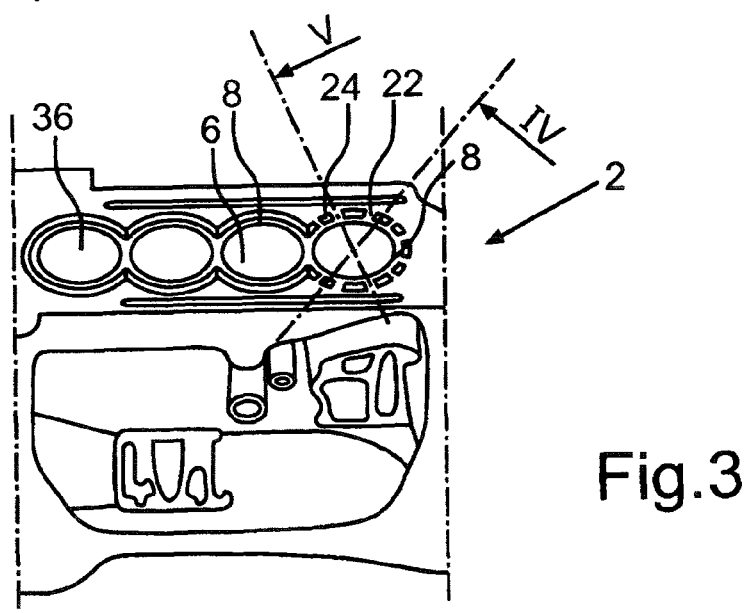
Figure 4:
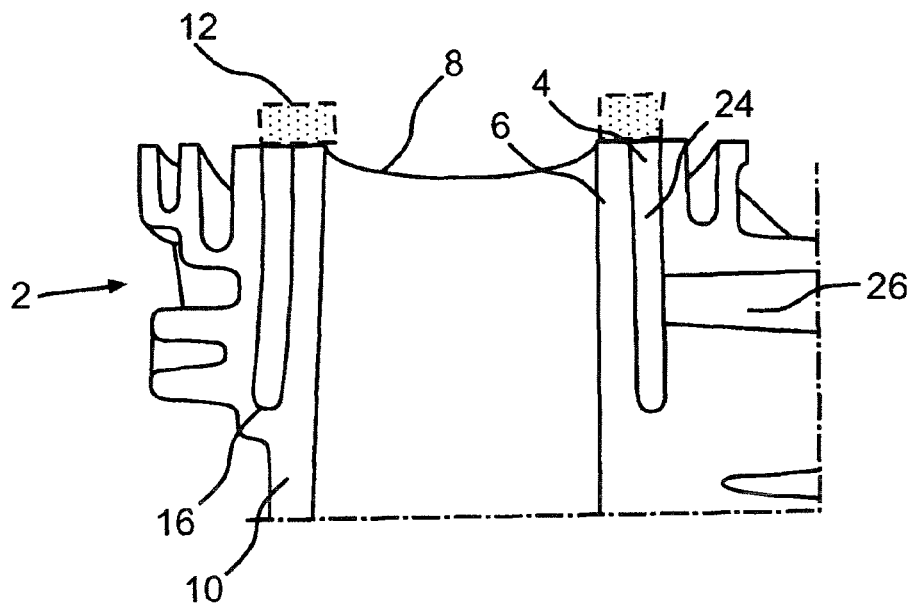
Figure 5:
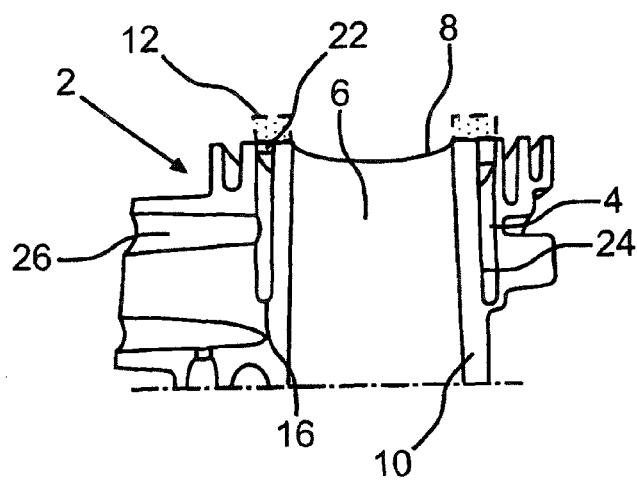
Figure 6:
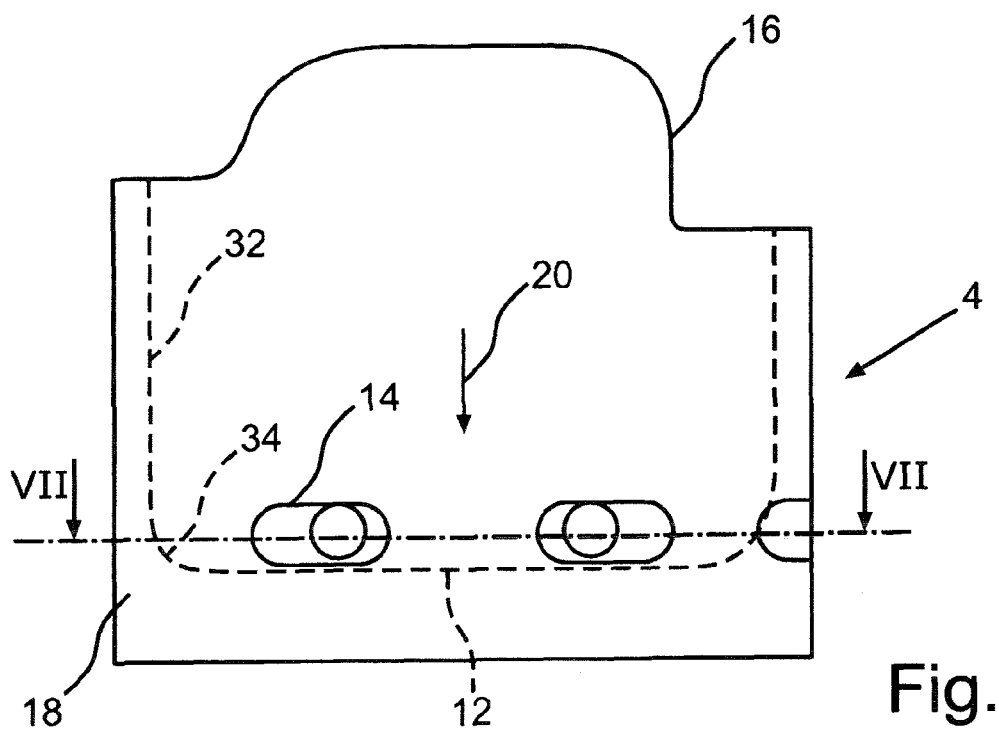
Figure 7:
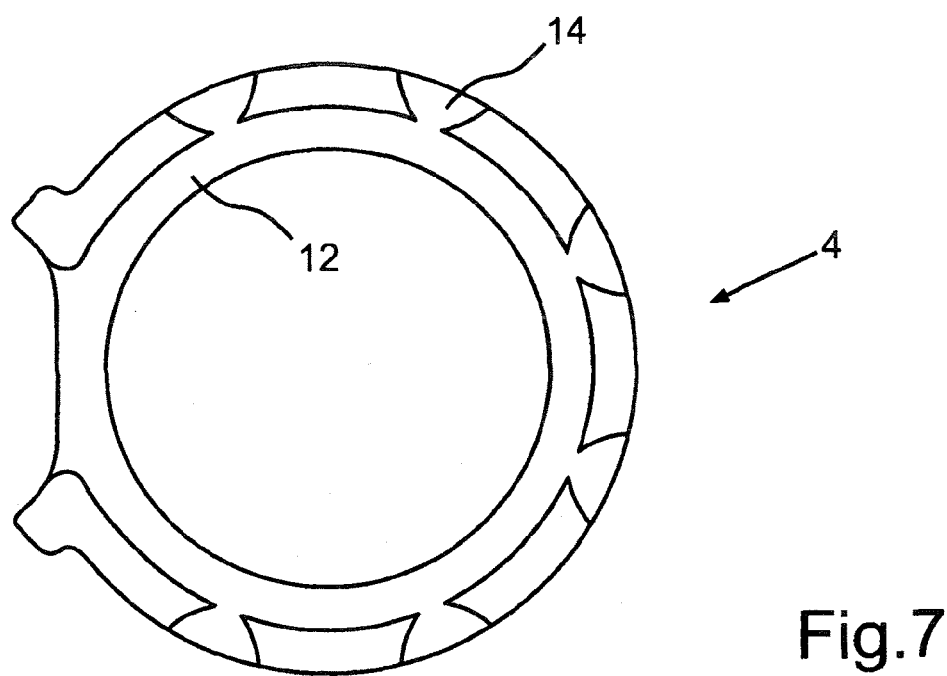
Figure 8:
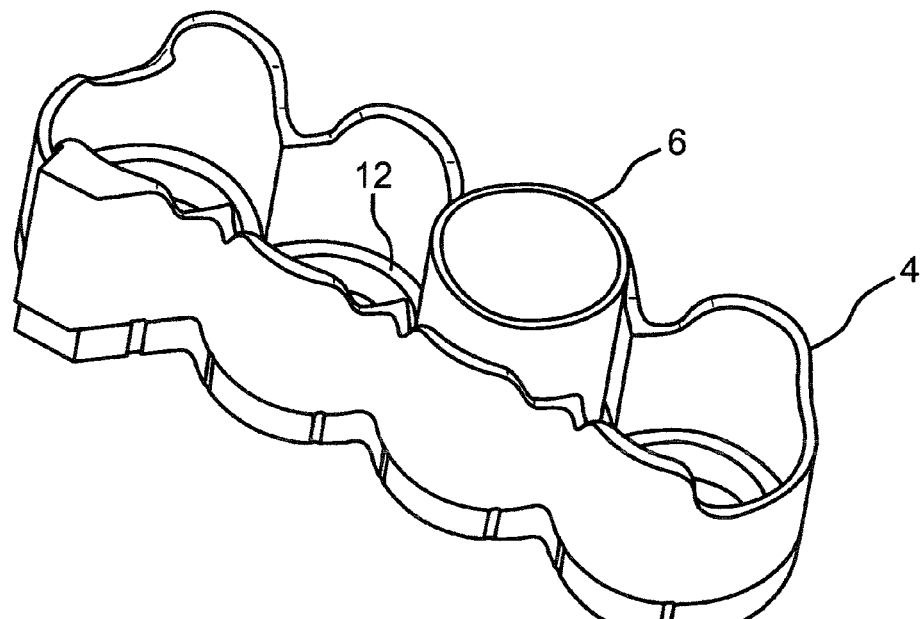
Figure 9:
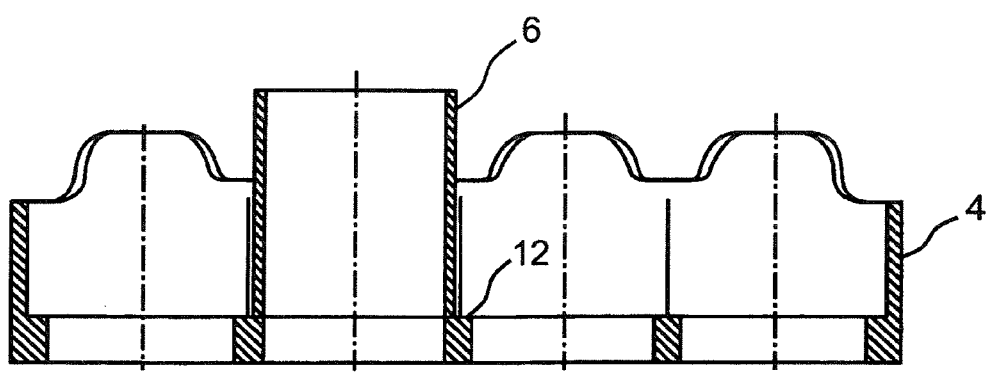

In the following, examples of the invention and further advantageous characteristics of the invention are explained in more detail by means of the following figures, it shows thereby:

FIG. 1 a removable core for placing into a diecasting tool,

FIG. 2 a cylinder crankcase in a mixed open/closed deck design with a cast core, FIG. 3 a cylinder crankcase in a closed deck design with a removed salt core, FIG. 4 a section through a cylinder crankcase along line IV in FIG. 3, FIG. 5 a section through a cylinder crankcase along line V in FIG. 3, FIG. 6 a schematic depiction of a single core with conical tapering, and FIG. 7 a section through the core along line VII in FIG. 6, FIG. 8 a section along the longitudinal axis through a salt core with an inserted cylinder sleeve, FIG. 9 a salt core with an inserted cylinder sleeve.

For the production of a cylinder crankcase 2 in the closed deck design, cylinder sleeves 6 corresponding to the number of cylinders of the engine to be produced are placed on (not shown) center sleeves. Center sleeves are cylindrical carriers (pushers), which can be moved with regard to the casting tool (also not shown). This is shown in an exemplified manner for a 4 cylinder crankcase in FIGS. 8 and 9, where the coherent salt core (4) contains a cylinder sleeve (6) in position 2. In the casting tool, the salt core (4) is supported—in the orientation according to FIG. 8 from beneath—by the casting tool, so that the crown (12) leads to a fixation of the salt core (4) on both sides. The center sleeves are withdrawn from the casting tool after the casting, and the cavity forming the cylinder space is released. An additional pusher is used with conventional diecasting tools, which forms a water jacket 24 around the cylinder sleeves 6. The water jacket 24 is however open towards a cylinder head, as is the case with the three left cylinder bores 36 of FIGS. 2 and 3 (open deck). A gap in the form of the open water jacket 24 thus exists between the cylinder sleeve 6 and a housing wall 28, which is disadvantageous for the mechanical load capacity of the entire engine. These disadvantages have to be compensated by elaborate countermeasures.

For solving the problem, a salt core 4 according to FIG. 1 is placed into the diecasting tool instead of the (not shown) movable water jacket pusher or core. This salt core 4 is naturally provided for all cylinder sleeves, however, in the present FIGS. 1-3, only a single core is shown for demonstration purposes. The salt core 4 consists of salts that are known per se, especially Na and/or KCl. It is essentially composed of a salt and different binders. In a preferred arrangement the binders contain alkaline or alkaline earth carbonates soluble in acid. The salt core 4 is for example made by a core blast method, especially a compression method. For this, special core tools are available which can be designed in such a manner that the corresponding number of cores corresponding to the number of the cylinders are pressed into an integral core component. The salt core is possibly still dried or sintered.

The salt core according to FIG. 1 comprises a crown 12, which is connected to a core shroud in the region on the cylinder head side. The salt core 4 is placed on the cylinder sleeve 6 in such a manner that the crown 12 covers an end 8 of the cylinder sleeve 6 on the cylinder head side. In this manner, the salt core 4 is connected to the cylinder sleeve 6 and to the diecasting tool. The core is thus (in contrast to U.S. Pat. No. 4,446,906) supported and thus withstands the very high pressure during the casting process without breaking. A core shroud 30 progresses concentrically to the cylinder sleeve 6 with a distance of a few millimeters. The core shroud comprises a curved lower boundary line 16 at the region of the salt core 4 on the crankshaft side. The boundary line 16 could also be designed in a cascaded or like manner.

In FIG. 2 is shown a crankcase 2, into which is cast a core according to FIG. 1. The crown 12 of the salt core 4 can still be seen over the end 8 of the left cylinder sleeve 6 on the cylinder head side. After the casting process, the salt core 4 is removed by a fluid medium, e.g. water. The core thereby decomposes into its granulate components and is washed out by the water. If carbonate salts are used as binders, slightly acidic, especially salt or carbon-containing aqueous washing solutions are preferably used. The core material can for example be washed out through the channel 26 (FIGS. 4 and 5) of the cylinder crankcase. Metallic webs 22 remain at the end 8 of the cylinder sleeve 6 on the cylinder head side after washing out, which pass through the water jacket 24 and which partially close this towards the cylinder head (not shown) (FIG. 3). This is called a closed deck cylinder crankcase.

The metallic webs 22 result by casting metal which flows through vertical openings 14 in the salt core 4 and solidifies. The openings 14 are arranged directly beneath the end 8 of the cylinder sleeve 6 on the cylinder head side. The geometry of the webs 22 and its number thus depends on the type of opening 14 in the salt core 4. Their arrangement will be discussed later in detail.

In FIG. 3 are shown two sectional lines IV and V, wherein line IV runs through the free water jacket 24 and this section is shown schematically in FIG. 4. Line V runs through two metallic webs 22, which correlates with the depiction in FIG. 5. In the section according to FIG. 4, the water jacket 24 is open towards the cylinder head, which enables a connection of the water circuits from the cylinder head and from the crankcase. The core is still contained in the cast crankcase in this depiction. For a better illustration of the arrangement of the core in the diecasting tool or in the crankcase, the crown 12 of the salt core 4 is shown in a dashed line above the cylinder sleeve, even though it has already been removed in this cut open state. In the sectional depiction according to FIG. 5, the salt core 4 has already been removed from the crankcase 2, the water jacket 24, which is covered at the end 8 of the cylinder sleeve 6 on the cylinder head side by the webs 22, is now exposed. The granulate components have run out through the channel 26. In this depiction, the original position of the crown 12 above the cylinder sleeve 6 is also marked by a dashed line for the better understanding.

Furthermore, an advantageous geometry of the core 12 is suggested by means of FIGS. 6 and 7. The vertical openings 14 are designed in the form of pendular bores in FIGS. 6 and 7, which taper from the outside to the inside similar to loopholes. However, elongated holes running vertically inwards at the walls can also be advantageous. The core 4 according to FIG. 1 comprises approximately rectangular openings 14. The recess in the region of the crown 12 are caused by the core compression mold with this core. The geometry of the openings can be adapted within broad limits to the requirements of the webs to be formed.

It has also emerged that it contributes to a better core stability during the casting process, if an outer contour 18 of the core 6 tapers especially in the region of the crown 12, as is shown in FIG. 6. It is further advantageous for avoiding voltage peaks to design a core inner contour 32 in such a manner that it comprises a slight (shown exaggerated here) rounding in the form of a radius 34 in the transfer region to the crown 12.

It shall also be mentioned with regard to the casting method, that it is usually an aluminum or magnesium diecast. A combination of both metals is also possible.

The cylinder sleeves are usually produced of several cylinder sleeves cast together to one component. These are then placed into the diecasting tool with the salt core, together with the sleeves. FIG. 8 and FIG. 9 show a liner packet with only a single cylinder sleeve. The crankcase can thereby consist of a high-strength aluminum alloy, for example an over-eutectic Al/Si alloy or also of gray cast iron. The actual crankcase is subsequently cast from a light metal alloy, especially a light magnesium alloy or a further aluminum alloy. The cylinder sleeves 6 can principally also consist of gray cast iron, other special alloys or compound materials, as for example Al//$Al_2O_3$/Si compound materials.

LIST OF REFERENCE NUMERALS

2 Cylinder crankcase
4 Salt core
6 Cylinder sleeve
8 End on the cylinder head side
10 End on the crankshaft side
12 Crown of the core
14 Vertical opening
16 Lower boundary line
18 Outer contour of the core
20 Direction on the cylinder head side
22 Metallic webs
24 Water jacket
26 Channel
28 Housing wall
30 Core shroud
32 Inner contour of the core
34 Radius
36 Cylinder bore

The invention claimed is:

1. A diecasting tool for the production of a cylinder crankcase (2), comprising a salt core (4) and at least one cylinder sleeve (6), wherein the at least one cylinder sleeve (6) comprises an upper end (8) on a cylinder head side, and a lower end (10) on a crankshaft side, and the at least one cylinder sleeve (6) is supported on at least one center sleeve that is disposed on the diecasting tool, and the salt core (4) at least partially surrounds the at least one cylinder sleeve (6) in the manner of a cladding, wherein the salt core (4) comprises a crown (12) that at least partially bears on one of the ends (8, 10) of the at least one cylinder sleeve (6), and wherein the core (4) comprises openings (14) that extend vertically beneath the upper end (8) of the at least one cylinder sleeve (6) on the cylinder head side.

2. The diecasting tool according to claim 1, wherein the crown (12) is fixed at the end (8) of the cylinder sleeve on the cylinder head side and a boundary wall of the diecasting tool.

3. The diecasting tool according to claim 1, wherein the salt core (4) is in connection with the at least one cylinder sleeve (6) and an interior wall of a tool.

4. The diecasting tool according to claim 3, wherein the crown abuts the interior wall of the tool.

5. The diecasting tool according to claim 1, wherein the salt core (4) abuts the interior wall of the tool on the crankshaft side.

6. The diecasting tool according to claim 1, wherein a lower boundary line (16) of the salt core (4) comprises a curvilinear or cascaded form on the crankshaft side.

7. The diecasting tool according to claim 1, wherein an outer contour (18) of the core tapers conically in the direction (20) of the cylinder head side.

8. The diecasting tool according to claim 1, wherein the openings (14) in the salt core (4) narrow from the outside to the interior.

9. A method for the production of a cylinder crankcase, comprising the following steps,
- placing a cylinder sleeve (6) on a center sleeve of a diecasting tool,
- positioning a salt core (4) in the diecasting tool in such a manner that:
  - a crown (12) of the salt core (4) bears on one end (8, 10) of the cylinder sleeve (6) and
  - the salt core (4) comprises vertical openings (14) that extends beneath an end (8) of the cylinder sleeve (6) on a cylinder head side,
- casting a casting material with elevated pressure, and
- solidifying the casting metal and removing the salt core.

* * * * *